US010102035B2

(12) United States Patent
Bartfai-Walcott et al.

(10) Patent No.: US 10,102,035 B2
(45) Date of Patent: Oct. 16, 2018

(54) TECHNIQUES FOR COMPUTING RESOURCE DISCOVERY AND MANAGEMENT IN A DATA CENTER

(71) Applicant: Intel Corporation, Santa Clara, CA (US)

(72) Inventors: Katalin K. Bartfai-Walcott, El Dorado Hills, CA (US); John Kennedy, Clane (IE); Thijs Metsch, Cologne (DE); Chris Woods, Dublin (IE); Giovani Estrada, Dublin (IE); Alexander Leckey, Kilcock (IE); Joseph Butler, Stamullen Co. Meath (IE); Slawomir Putyrski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/112,309

(22) PCT Filed: Feb. 23, 2015

(86) PCT No.: PCT/US2015/017083
§ 371 (c)(1),
(2) Date: Jul. 18, 2016

(87) PCT Pub. No.: WO2015/130606
PCT Pub. Date: Sep. 3, 2015

(65) Prior Publication Data
US 2017/0255494 A1    Sep. 7, 2017

Related U.S. Application Data

(60) Provisional application No. 61/945,759, filed on Feb. 27, 2014, provisional application No. 61/945,761, filed on Feb. 27, 2014.

(51) Int. Cl.
*G06F 9/50* (2006.01)

(52) U.S. Cl.
CPC .................. *G06F 9/5027* (2013.01)

(58) Field of Classification Search
CPC ...................................... G06F 9/5027
See application file for complete search history.

(56) References Cited

U.S. PATENT DOCUMENTS 7,349,965 B1    3/2008  Graupner et al.
9,642,112 B2 *  5/2017  Costa .................. H04W 64/003
(Continued)

FOREIGN PATENT DOCUMENTS

JP    2004021325 A    1/2004
JP    2005050306 A    2/2005
(Continued)

OTHER PUBLICATIONS

International Search Report and Written Opinion received for International Application No. PCT/US2015/017083, dated May 18, 2015, 11 pages.
(Continued)

*Primary Examiner* — Meng Al T An
*Assistant Examiner* — Michael W Ayers
(74) *Attorney, Agent, or Firm* — Compass IP Law PC

(57) ABSTRACT

Examples are described for computing resource discovery and management for a system of configurable computing resources that may include disaggregate physical elements such as central processing units, storage devices, memory devices, network input/output devices or network switches. In some examples, these disaggregate physical elements may be located within one or more racks of a data center.

14 Claims, 8 Drawing Sheets

(56) References Cited

U.S. PATENT DOCUMENTS

| | | |
|---|---|---|
| 2003/0195951 A1* | 10/2003 | Wittel, Jr. et al. ...... H04L 67/34 709/220 |
| 2005/0132352 A1* | 6/2005 | Shen ................... G06F 9/4415 717/174 |
| 2005/0234824 A1 | 10/2005 | Gill et al. |
| 2007/0067435 A1 | 3/2007 | Landis et al. |
| 2008/0276320 A1 | 11/2008 | Ben-Itzhak |
| 2009/0327480 A1 | 12/2009 | Wookey |
| 2012/0005344 A1 | 1/2012 | Kolin et al. |
| 2012/0188870 A1 | 7/2012 | Eisenhauer et al. |
| 2012/0260247 A1 | 10/2012 | Huang et al. |
| 2013/0139233 A1* | 5/2013 | Maity ................... H04L 63/08 726/7 |
| 2013/0198346 A1 | 8/2013 | Jubran et al. |
| 2013/0254566 A1* | 9/2013 | Florez-Larrahondo ..................... H04L 41/0226 713/310 |
| 2013/0311632 A1 | 11/2013 | Chang et al. |
| 2014/0025909 A1* | 1/2014 | Naor ................... G06F 3/0641 711/162 |

FOREIGN PATENT DOCUMENTS

| | | |
|---|---|---|
| JP | 2006185061 A | 7/2006 |
| JP | 2008250544 A | 10/2008 |
| JP | 2013250732 A | 12/2013 |
| WO | 2015/130606 A1 | 9/2015 |

OTHER PUBLICATIONS

International Preliminary Report on Patentability received for International Application No. PCT/US2015/017083, dated Sep. 9, 2016, 8 pages.
Extended European Search Report for Patent Application No. 15754522.9, dated Aug. 3, 2017, 9 pages.
Organized Translation of Reasons for Refusal for Japanese Patent Application No. 2016-545889, dated Jun. 15, 2017, 3 pages.
Korean and English Translation of Korean Office Action for Patent Application No. 10-2016-7020375, dated Feb. 20, 2018, 11 pages.
Korean and English Translation of Korean Office Action for Patent Application No. 10-2016-7020375, dated Jul. 18, 2018, 5 pages.

* cited by examiner

*Storage Medium 700*

*Computer Executable Instructions for 600*

*FIG. 7*

TECHNIQUES FOR COMPUTING RESOURCE DISCOVERY AND MANAGEMENT IN A DATA CENTER

RELATED CASE

The present application is a national stage application under 35 U.S.C. § 371 of International Application No. PCT/US2015/017083 filed on Feb. 23, 2015. Said application No. PCT/US2015/017083 claims the benefit of U.S. Provisional Application No. 61/945,759 filed Feb. 27, 2014, and the benefit of 61/945,761 filed Feb. 27, 2014. Said Application No. PCT/US2015/017083, said Application No. 61/945,759, and said Application No. 61/945,761 are hereby incorporated herein by reference in their entireties.

BACKGROUND

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may assign logical servers or virtual machines (VMs) to allocated portions of pooled and/or configurable computing resources in order to place or compose these logical servers or VMs into use. Various users or applications may then utilize this allocated infrastructure in a shared manner via access to these placed or composed logical servers or VMs.

BRIEF DESCRIPTION OF THE DRAWINGS

FIG. 7 illustrates an example of a storage medium.

DETAILED DESCRIPTION

Data centers may be generally composed of racks that contain various types of hardware or configurable computing resources (e.g., storage, central processing units (CPUs), memory, networking, etc.) from multiple vendors. The various types of hardware or configurable computing resources deployed in data centers may also be referred to as disaggregate physical elements. There may be no automated solution that allows a data center or rack management system to discover the nature or capabilities of separate pieces of hardware introduced (or removed) to the system such as a rack. Additionally, each type of hardware, computing resource or disaggregate physical element typically has its own custom management application programming interface (API). In other words, there may be a lack of generic way to manage arbitrary hardware, computing resources or disaggregated physical elements added or removed from a system. Data center or rack management systems may have to be specially developed, modified or extended to deal with a unique API associated with each type of hardware, computing resource or disaggregate physical element introduced. It is with respect to these and/or other challenges that the examples described herein are needed.

In some examples, techniques for computing resource discovery and management may be implemented that may include receiving, at a controller, an indication that a computing resource has been added to a system of configurable computing resources. The methods may also include querying a service processor for the computing resource to discover capabilities associated with the computing resource and obtain a uniform resource locator (URL) to access additional information for the discovered capabilities. The methods may also include accessing the additional information using the URL and retrieving one or more management application plugins or extensions for the controller to manage, control or advertise the discovered capabilities.

Figure 1:
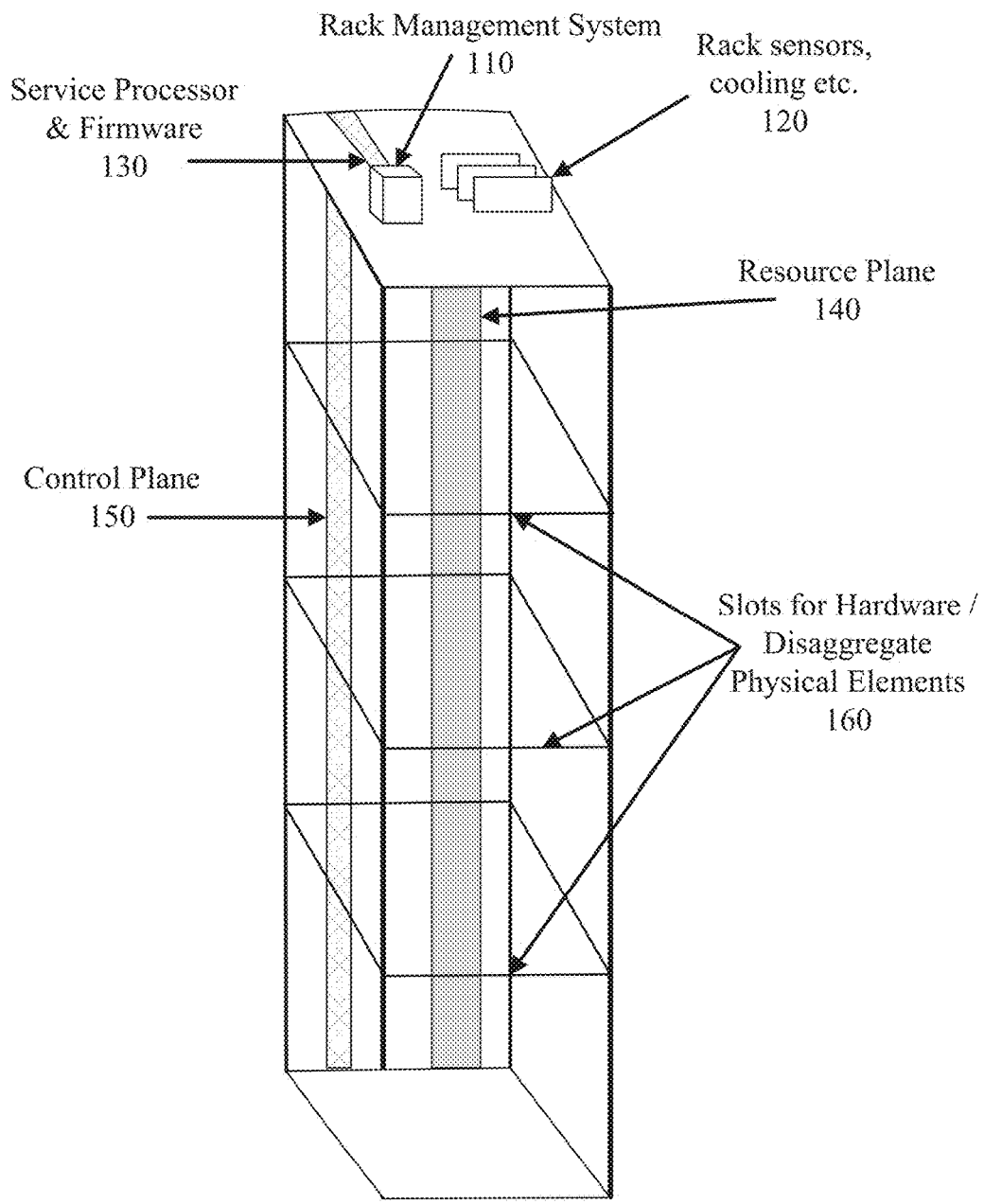
FIG. 1 illustrates an example rack.

FIG. 1 illustrates an example rack 100. As shown in FIG. 1, rack 100 includes a rack management system 110, rack sensors, cooling etc. 120, service processor & firmware 130, a resource plane 140, a control plane 150 and slots for hardware/disaggregate physical elements 160. According to some examples, slots for hardware/disaggregate physical elements 160 may house hardware, configurable computing resources or disaggregate physical elements that may include, but are not limited to CPUs, storage devices (e.g., hard disk drives or solid state drives), memory devices (e.g., random access memory (RAM)), network input/output (NW I/O) devices or NW switches. For these examples, a controller or rack management system 110 for rack 100 may be run through or on service processor and firmware 130. Also, rack 110 may include sensors, cooling and other equipment such as rack sensors, cooling, etc. to support, manage or control the configurable computing resources.

Figure 2:
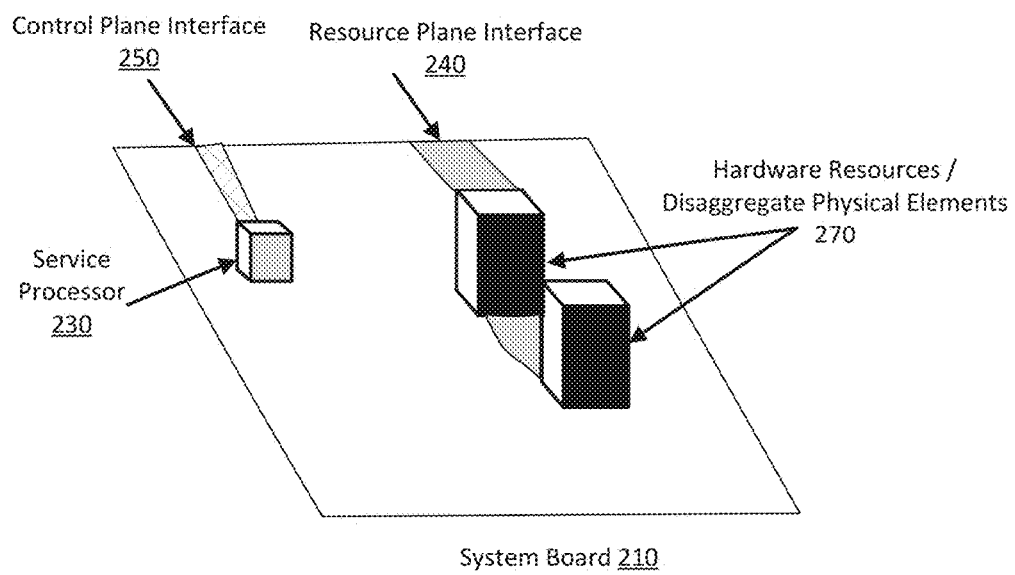
FIG. 2 illustrates an example board.

FIG. 2 illustrates an example board 200. As shown in FIG. 2, board 200 may include a service processor 230, a resource plane interface 240, a control plane interface 250 and hardware resources 270. In some examples, hardware resources/disaggregate physical elements 270 may be communicatively coupled to resource plane 140 of rack 100 through resource plane interface 240. Also, service processor & firmware 230 may communicatively couple to control plane 150 of rack 100 through control plane interface 250.

According to some examples, hardware resources/disaggregate physical elements 270 may include various types of configurable computing resources or disaggregate physical elements such as CPUs, storage devices, memory devices, NW I/O devices or NW switches. Also, service processor 230 may include logic and/or features capable of providing an API for querying capabilities of hardware resources/disaggregate physical elements 270 via a control plane such as control plane 130. In some examples, service processor may be configured or arranged to function as a baseboard management controller for hardware resources/disaggregate physical elements 270 to function within a rack such as rack 100.

As described more below, a controller or manager may query a hardware resource such as hardware resources/disaggregate physical elements 270 through a service processor such as service processors 230. This query may be to not only discover capabilities of the hardware resources but to also obtain a URL to seek and/or obtain additional information to utilize or manage those capabilities.

In some examples, the API provided by service processor 230 may be completely self-describing and discoverable allowing arbitrary functionality to be queried and exposed. The API may also be RESTful (representational state transfer), allowing manipulation by arbitrary management systems. The API may also facilitate identification of (e.g. by URL) a publically available schema that it uses to describe the features of hardware resource 270 and enable features of the hardware using that schema to be obtained. The API may also allow for unique identifiers for hardware resources/disaggregate physical elements 270 (and any removable subcomponents) to be queried. The API may also allow the status of hardware resources/disaggregate physical elements 270 to be queried. The API may also allow for the status of hardware resources/disaggregate physical elements 270 to be managed. The API may also allow monitoring information for hardware resources/disaggregate physical elements 270 that was captured and/or stored by elements of hardware resources/disaggregate physical elements 270 to be queried. The API may also be implemented using technologies such as encryption, trusted execution technology and attestation to increase confidence that hardware resources/disaggregate physical elements 270 is genuine, has not been tampered with, and the API interactions have not been intercepted and/or manipulated.

Figure 3:
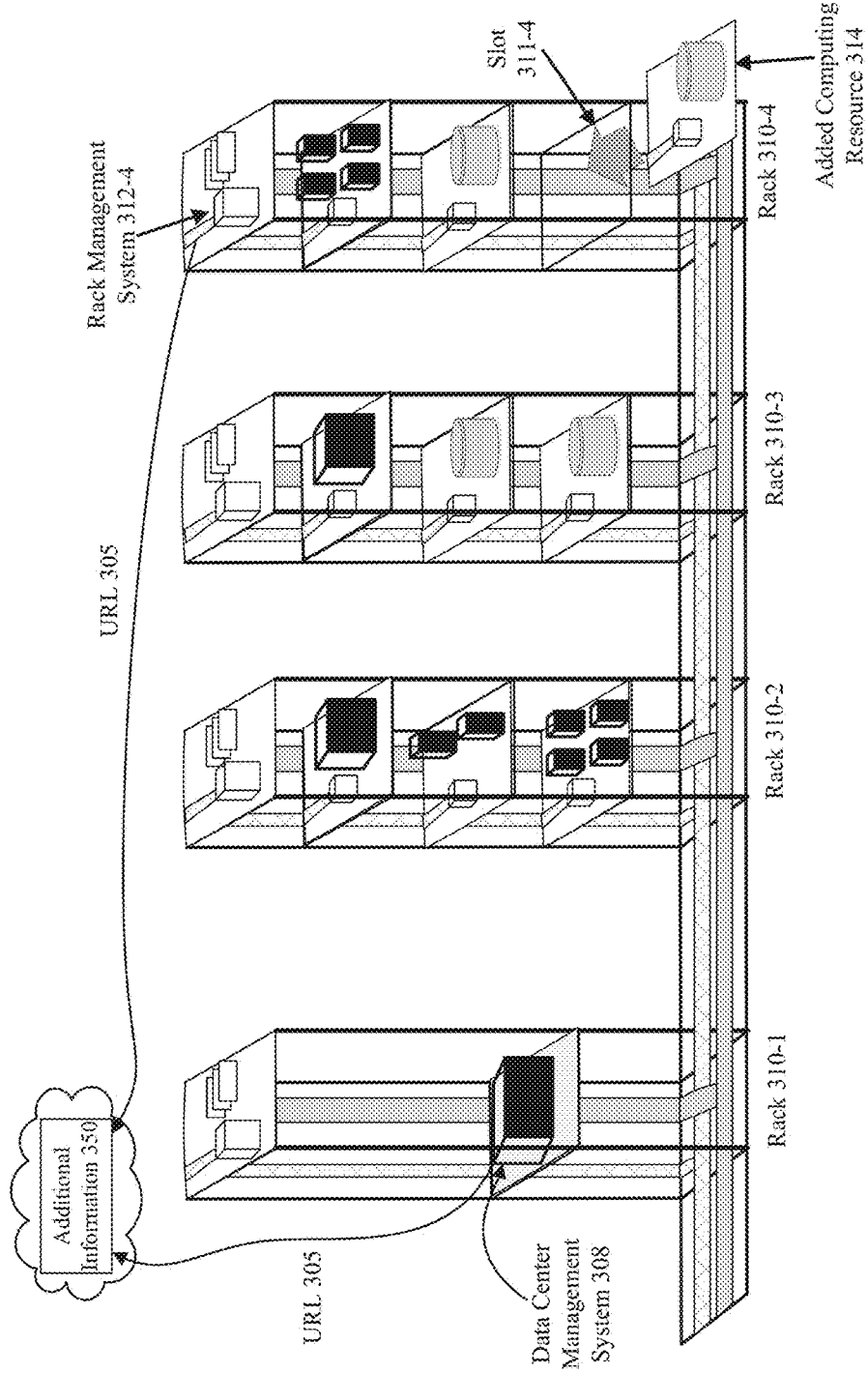
FIG. 3 illustrates an example system.

FIG. 3 illustrates an example system 300. As shown in FIG. 3, in some examples, system 300 may include racks 310-1 to 310-4. For these examples, a data center management system 308 may be housed at rack 310-1 while a rack management system 312-4 may be housed with rack 310-4. Racks 310-1 to 310-3 may also include similar rack management systems but they are not labeled in FIG. 3.

According to some examples, when added computing resource 314 is inserted in slot 311-4, connectors or connectors (not shown) in rack 310-4 that deliver 1) power 2) connectivity for managing or controlling (control plane), and 3) connectivity for normal usage of the hardware (resource plane) may connect to connectors in hardware 314 (not shown). For these examples, as a service processor on added computing resource 314 receives power the service processor boots automatically and announces or enables rack management system 312-4 or data center management system 308 to detect the arrival of added computing resource 314. For example, rack management system 312-4 or data center management system 308 may detect the arrival while monitoring rack or system-wide control planes.

In some examples, rack management system 312-4 or data center management system 308 may query a service processor included on added computing resource 314 to discover its nature and capabilities (e.g., maintained in accessible memory at or with the service processor). For these examples, the service processor may also pass to rack management system 312-4 or data center management system 308 a URL 305 of a publically available model, schema or information which includes more detailed definitions of added computing resource 314's capabilities. The publically available information may also include a populated instance of this model that may detail specific capabilities of added computing resource 314.

According to some examples, rack management system 312-4 or data center management system 308 may include logic or features to use URL 305 to retrieve and install any associated plugins and extensions designed for use by rack management system 312-4 or data center management system 308 that they may fully exploit the capabilities described in the model In some examples, if added computing resource 314 includes some storage with a previously unsupported power consumption monitoring capability, then associated plug ins and extensions would allow rack management system 312-4 or data center management system 308 to advertise an ability to host logical computers with storage that can have its power consumption monitored. Also, rack management system 312-4 or data center management system 308 may be capable of scheduling storage resources that require monitoring onto added computing resource 314 since this new computing resource is now capable of meeting this requirement. Also, rack management system 312-4 or data center management system 308 may query, process or act on the new monitoring data appropriately using new algorithms, logic and rules downloaded in the extension or extensions. Monitoring information, for example, may include, but is not limited to an operating temperature added computing resource 314, a power consumption rate for added computing resource 314, a utilization rate of added computing resource 314 or an operating cost (e.g., in US $) for added computing resource 314.

In some examples, rack management system 312-4 or data center management system 308 may register added computing resource 314 to a pool of hardware or configurable computing resources managed within their respective system or rack.

According to some examples, rack management system 312-4 or data center management system 308 (now with extensions installed so its algorithms can comprehend and manipulate the complete feature set of added computing resource 314 appropriately) may interact with added computing resource 314 through the hardware's API routed through its service processor.

In some examples, added computing resource 314 is removed from the rack, rack management system 312-4 or data center management system 308 may detect this removal and added computing resource 314 may be marked as no longer available and any required recovery steps may be instigated.

Figure 4:
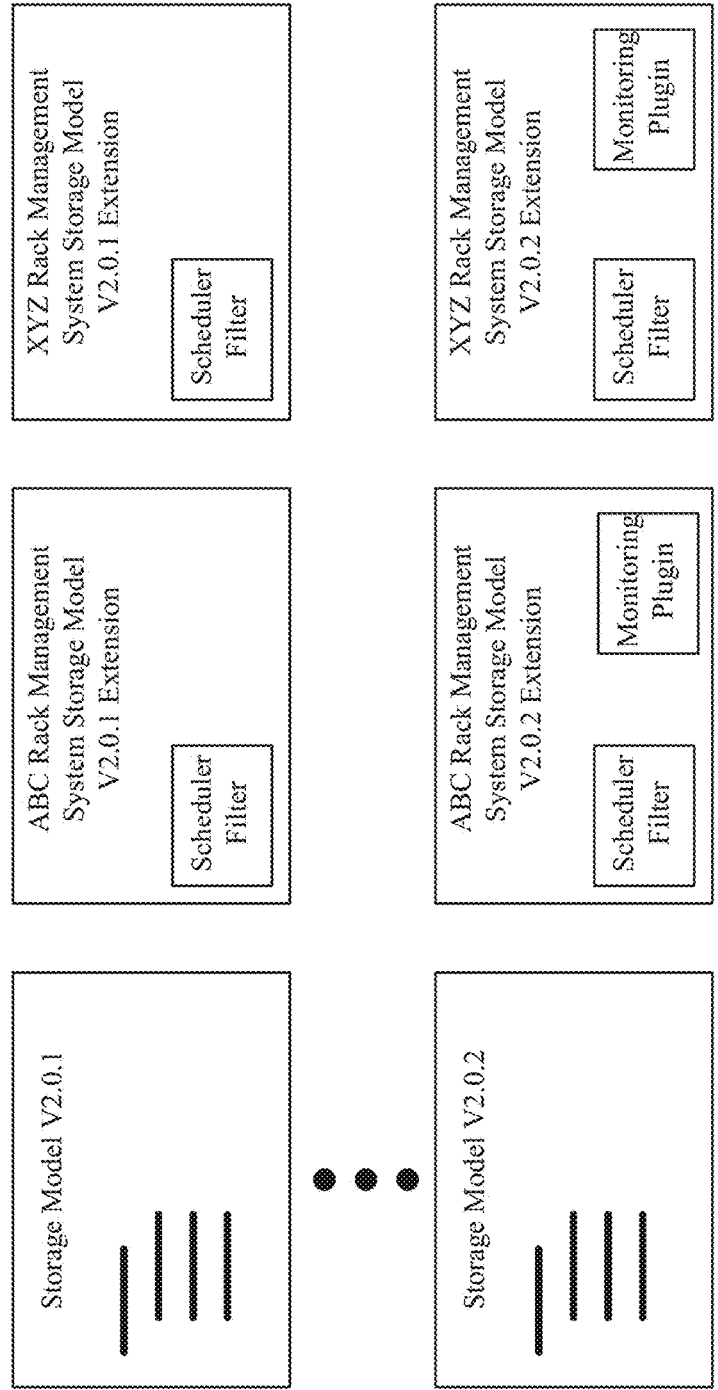
FIG. 4 illustrates an example additional information

FIG. 4 illustrates an example additional information 400. In some examples, as shown in FIG. 4, additional information 400 may present an example of a publically available model or scheme. For these examples, a manager or controller such as rack management system 312-4 or data center management system 308 may use a URL obtained from a recently added and queried computing resource to access additional information 400. The manager or controller may utilize additional information 400 to retrieve or download one or more management application plugins or extension for the manager or controller to manage, control or advertise capabilities discovered about the recently added and queried computing resource. For example, as shown in FIG. 4, an updated storage model V2.0.2 (e.g., for a storage device) may include a monitoring plugin as compared to a previous storage model V2.0.1. Storage model V2.0.2 may be retrieved or downloaded to obtain this monitoring plugin and then use this monitoring plugin to manage, control or advertise capabilities of a newly added storage device. Examples are not limited to information, plugins or extensions depicted in additional information 400.

Figure 5:
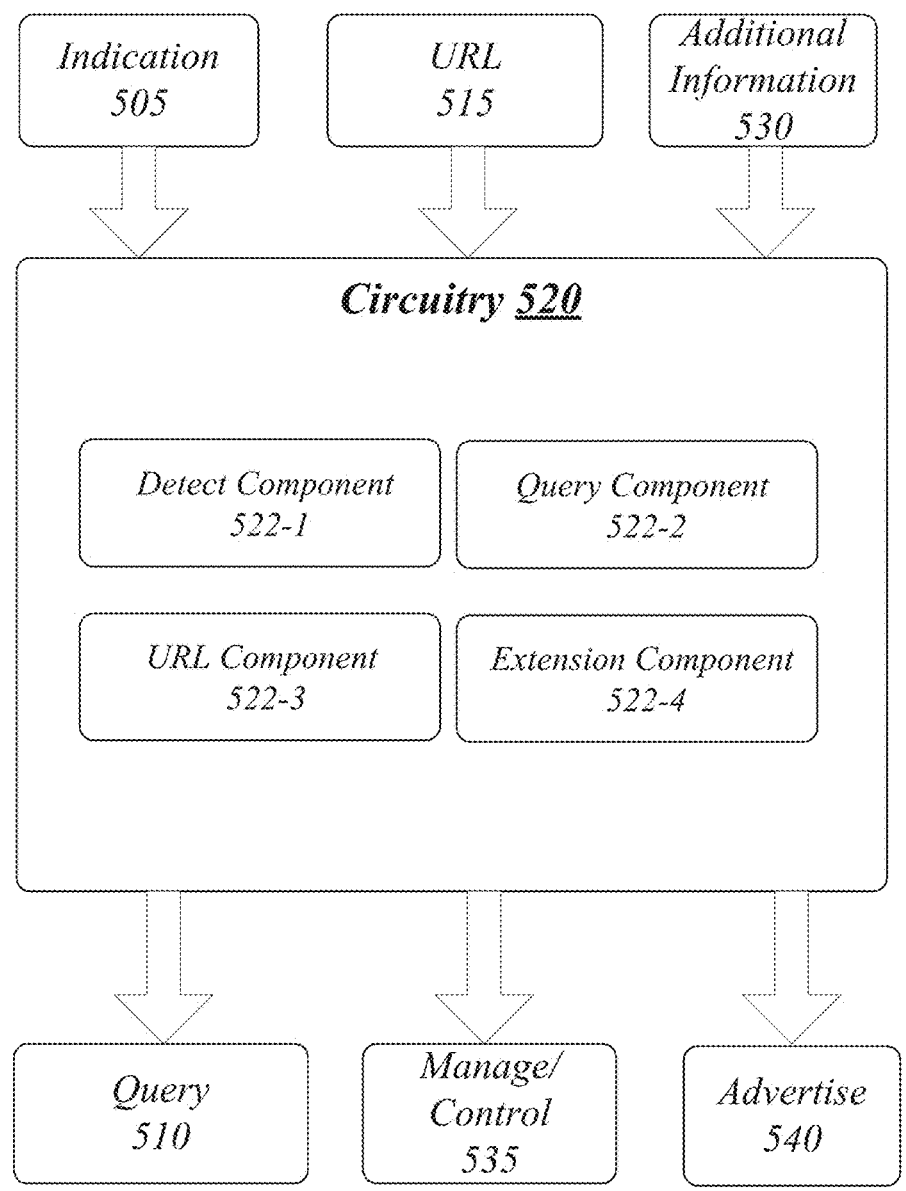
FIG. 5 illustrates an example block diagram for an apparatus.

FIG. 5 illustrates an example block diagram for an apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may be supported by circuitry 520 maintained at a computing device including logic or features to support a manager or controller for configurable computing resources. Circuitry 520 may be arranged to execute one or more software or firmware implemented modules or components 522-a. It is worthy to note that "a" and "b" and "c" and similar designators as used herein are intended to be variables representing any positive integer. Thus, for example, if an implementation sets a value for a=4, then a complete set of software or firmware for components 522-a may include components 522-1, 522-2, 522-3 or 522-4. The examples presented are not limited in this context and the different variables used throughout may represent the same or different integer values.

According to some examples, circuitry 520 may include a processor or processor circuitry. Circuitry 520 may be part of a computing device circuitry that includes processing cores (e.g., used as a central processing unit (CPU)). The circuitry including one or more processing cores can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia® Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as part of circuitry 520. According to some examples circuitry 520 may also be an application specific integrated circuit (ASIC) and at least some components 522-a may be implemented as hardware elements of the ASIC.

According to some examples, apparatus 500 may include a detect component 522-1. Detect component 522-1 may be executed by circuitry 520 to detect that a computing resource has been added to a system of configurable computing resources. For these examples, the detection may be received via indication 505 that may be triggered when a service processor at the computing resource sends indication 505 (e.g., over a control plane).

According to some examples, apparatus 500 may also include a query component 522-2. Query component 522-2 may be executed by circuitry 520 to query a service processor for the computing resource to discover capabilities associated with the computing resource and obtain a URL. For these examples, the query may be included in query 510 that may be sent over a control plane coupled to the service processor. The service processor may include the URL in URL 515 that may be sent over the control plane.

In some examples, apparatus 500 may also include a URL component 522-3. URL component 522-3 may be executed by circuitry 520 to use the obtained URL to access additional information for the discovered capabilities. For these examples, URL component 522-3 may use the URL to obtain additional information 530.

In some examples, apparatus 500 may also include an extension component 522-4. Extension component 522-4 may be executed by circuitry 520 to retrieve one or more management application plugins or extensions for the controller to manage, control or advertise the discovered capabilities. For these examples, extension component 522-4 may use the additional information obtained by URL component 522-3 to retrieve the one or management application plugins or extensions and enable the manager or controller to send manage/control 535 or advertise 540 to manage, control or advertise the discovered capabilities.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
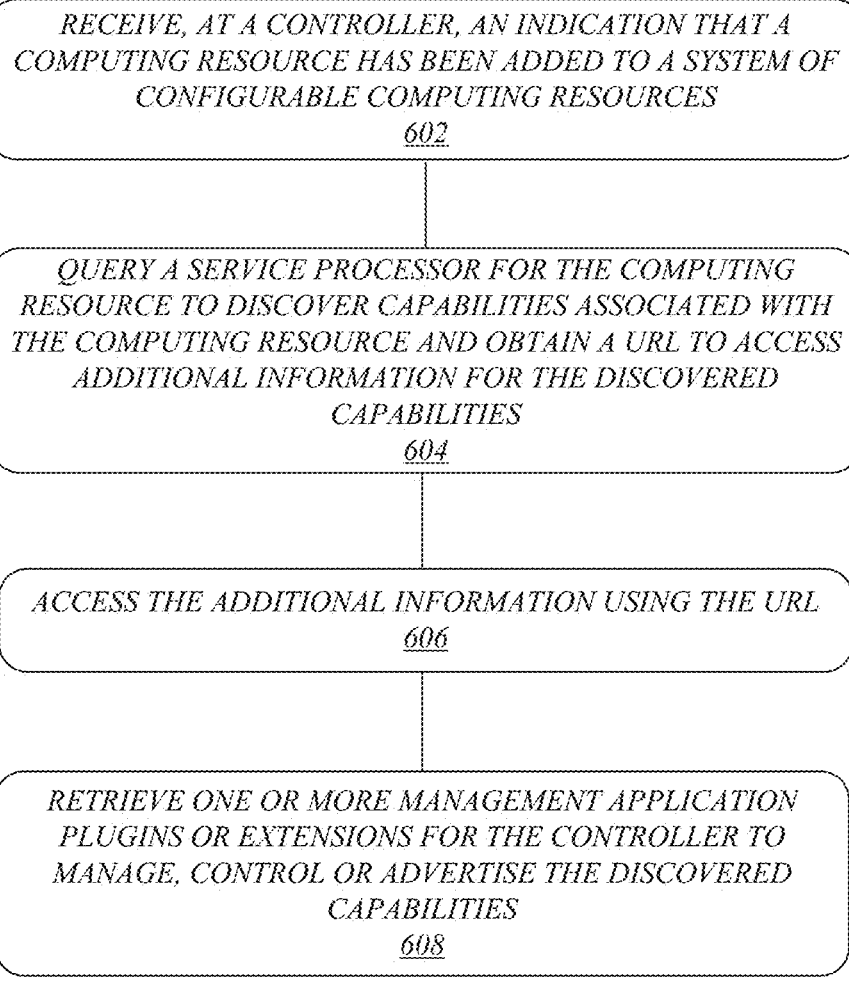
FIG. 6 illustrates an example of a logic flow.

FIG. 6 illustrates an example of a logic flow. As shown in FIG. 6 the logic flow includes a logic flow 600. Logic flow 600 may be representative of some or all of the operations executed by one or more logic, features, or devices described herein, such as apparatus 600. More particularly, logic flow 600 may be implemented by at least request component 522-1, score component 522-2, rank component 522-3 or allocate component 522-4.

According to some examples, logic flow 600 at block 602 may receive, at a controller, an indication that a computing resource has been added to for a system of configurable computing resources. For these examples, detect component 522-1 may receive the indication.

In some examples, logic flow 600 at block 604 may query a service processor for the computing resource to discover capabilities associated with the computing resource and obtain a URL to access additional information for the discovered capabilities. For these examples, query component 522-2 may query the service processor to discover the capabilities that may also include the URL to access the additional information.

According to examples, logic flow 600 at block 606 may access the additional information using the URL. For these examples, URL component 522-3 may use the obtained URL to access the additional information.

In some examples, logic flow 600 at block 608 may retrieve one or more management application plugins or extensions for the controller to manage, control or advertise the discovered capabilities. For these examples, extension component 522-4 may retrieve the one or more management application plugins or extensions.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
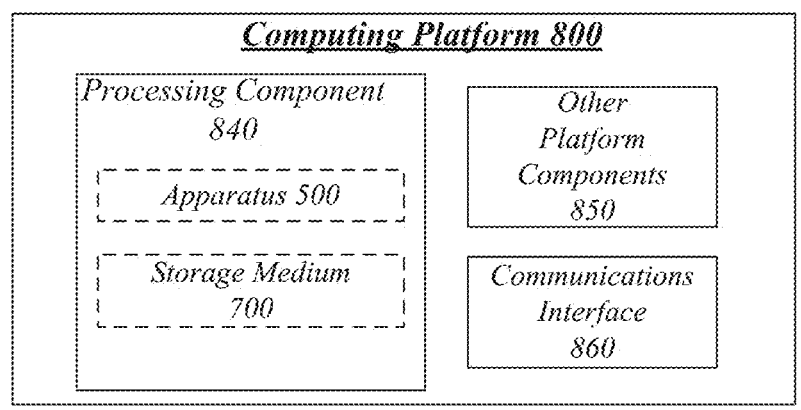
FIG. 8 illustrates an example computing platform.

FIG. 8 illustrates an example computing platform 800. In some examples, as shown in FIG. 8, computing platform 800 may include a processing component 840, other platform components or a communications interface 860. According to some examples, computing platform 800 may be implemented in a computing device such as a server in a system such as a data center or server farm that supports a manager or controller for managing configurable computing resources as mentioned above.

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.2.1, published in November 2007 ("the Infiniband Architecture specification").

Computing platform 800 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, ASICs, logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be to collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

EXAMPLE 1

An example apparatus may include circuitry for a controller. The apparatus may also include a detect component for execution by the circuitry to detect that a computing resource has been added to a system of configurable computing resources. The apparatus may also include a query component for execution by the circuitry to query a service processor for the computing resource to discover capabilities associated with the computing resource and obtain a URL. The apparatus may also include a URL component for execution by the circuitry to use the obtained URL to access additional information for the discovered capabilities. The apparatus may also include an extension component for execution by the circuitry to retrieve one or more management application plugins or extensions for the controller to manage, control or advertise the discovered capabilities.

EXAMPLE 2

The apparatus of example 1, the controller may be for a rack management system at a rack that includes the added computing resource.

EXAMPLE 3

The apparatus of example 2, the detect component may detect the computing resource through a control plane that couples to the service processor for the computing resource.

EXAMPLE 4

The apparatus of example 2, the system of configurable computing resources may be a data center. The rack may be one of a plurality of racks included in the data center. The data center may have a data center management system, the controller may be coupled to the data center management system through a control plane.

EXAMPLE 5

The apparatus of example 4, the URL component may provide the obtained URL to the data center management system for the data center management system to access additional information for the discovered capabilities. The data center management system may use the obtained URL to retrieve the one or more management application plugins or extensions and then forward to the extension component.

EXAMPLE 6

The apparatus of example 1, the system of configurable computing resources may be a data center. The controller may be for a data center management system capable of managing computing resources included in the data center.

EXAMPLE 7

The apparatus of example 6, the computing resource added to a rack having a rack management system coupled to the service processor for the computing resource through a control plane. The rack may be one of a plurality of racks included in the data center. The controller may be coupled to the rack management system and the service processor through the control plane.

EXAMPLE 8

The apparatus of example 7, the detect component may detect that the computing resource has been added to the data center via a notification from the rack management system.

EXAMPLE 9

The apparatus of example 1, the one or more management application plugins or extension may include an ability to monitor the discovered capabilities and to manage or control the computing resource based on monitoring information. The monitoring information may include an operating temperature, a power consumption rate, a utilization rate or an operating cost.

EXAMPLE 10

The apparatus of example 1, the service processor may be configured as a baseboard management controller.

EXAMPLE 11

The apparatus of example 1, the computing resource may be a disaggregate physical element capable of coupling to a rack included in the system of configurable computing resources. The disaggregate physical element may include one of a central processing unit, a memory device, a storage device, a network input/output device or a network switch.

EXAMPLE 12

The apparatus of example 1 may also include a digital display coupled to the circuitry to present a user interface view.

EXAMPLE 13

An example method may include receiving, at a controller, an indication that a computing resource has been added to a system of configurable computing resources. The method may also include querying a service processor for the computing resource to discover capabilities associated with the computing resource and obtain a URL to access additional information for the discovered capabilities. The method may also include accessing the additional information using the URL. The method may also include retrieving one or more management application plugins or extensions for the controller to manage, control or advertise the discovered capabilities.

EXAMPLE 14

The method of example 13, the controller may be for a rack management system at a rack that includes the added computing resource.

EXAMPLE 15

The method of example 14 may include detecting the computing resource through a control plane that communicatively couples the controller to the service processor for the computing resource.

EXAMPLE 16

The method of example 14, the system of configurable computing resources may be a data center. The rack may be one of a plurality of racks included in the data center. The data center may have a data center management system. The controller may be coupled to the data center management system through a control plane.

EXAMPLE 17

The method of example 13 may include providing the obtained URL to the data center management system for the data center management system to access additional information for the discovered capabilities. The data center management system may use the obtained URL to retrieve the one or more management application plugins or extensions. The method may also include receiving the one or more management application plugins or extensions from the data center management system.

EXAMPLE 18

The method of example 13, the system of configurable computing resources may be a data center. The controller may be for a data center management system capable of managing computing resources included in the data center.

EXAMPLE 19

The method of example 18, the computing resource may be added to a rack having a rack management system coupled to the service processor for the computing resource through a control plane. The rack may be one of a plurality of racks included in the data center. The controller may be coupled to the rack management system and the service processor through the control plane.

EXAMPLE 20

The method of example 19 may also include detecting that the computing resource has been added to the data center via a notification from the rack management system.

EXAMPLE 21

The method of example 13, the one or more management application plugins or extension may include an ability to monitor the discovered capabilities and to manage or control the computing resource based on monitoring information. The monitoring information may include an operating temperature, a power consumption rate, a utilization rate or an operating cost.

EXAMPLE 22

The method of example 13, the service processor may be configured as a baseboard management controller.

EXAMPLE 23

The method of example 13, the computing resource may be a disaggregate physical element capable of coupling to a rack included in the system of configurable computing resources. The disaggregate physical element may include one of a central processing unit, a memory device, a storage device, a network input/output device or a network switch.

EXAMPLE 24

An example at least one machine readable medium comprising a plurality of instructions that in response to being executed by system at a server cause the system to carry out a method according to any one of examples 13 to 23.

EXAMPLE 25

An example apparatus may include means for performing the methods of any one of examples 13 to 23.

EXAMPLE 26

An example at least one machine readable medium may include a plurality of instructions that in response to being executed by a controller for a system of configurable computing resources may cause the controller to receive an indication that a computing resource has been added to the system. The instructions may also cause the controller to query the computing resource to discover capabilities associated with the computing resource and obtain a URL to access additional information for the discovered capabilities. The instructions may also cause the controller to access the additional information using the URL. The instructions may also cause the controller to retrieve one or more management application plugins or extensions for the controller to manage, control or advertise the discovered capabilities.

EXAMPLE 27

The at least one machine readable medium of example 26, the controller may be for a rack management system at a rack that includes the added computing resource.

EXAMPLE 28

The at least one machine readable medium of example 27, the instruction to may further cause the controller to detect the computing resource through a control plane that communicatively couples the controller to the service processor for the computing resource.

EXAMPLE 29

The at least one machine readable medium of example 27, the system of configurable computing resources may be a data center. The rack may be one of a plurality of racks included in the data center. The data center may have a data center management system, the controller coupled to the data center management system through a control plane.

EXAMPLE 30

The at least one machine readable medium of example 26, the instructions may further cause the controller to provide the obtained URL to the data center management system for the data center management system to access additional information for the discovered capabilities. The data center management system may use the obtained URL to retrieve the one or more management application plugins or extensions. The instructions may also cause the controller to receive the one or more management application plugins or extensions from the data center management system.

EXAMPLE 31

The at least one machine readable medium of example 30, the system of configurable computing resources may be a data center. The controller may be for a data center management system capable of managing computing resources included in the data center.

EXAMPLE 32

The at least one machine readable medium of example 31, the computing resource may be added to a rack having a rack management system coupled to the service processor for the computing resource through a control plane. The rack may be one of a plurality of racks included in the data center. The controller may be coupled to the rack management system and the service processor through the control plane.

EXAMPLE 33

The at least one machine readable medium of example 32, the instructions may further cause the controller to detect that the computing resource has been added to the data center responsive to a notification from the rack management system.

EXAMPLE 34

The at least one machine readable medium of example 26, the one or more management application plugins or extension may include an ability to monitor the discovered capabilities and to manage or control the computing resource based on monitoring information. The monitoring information may include an operating temperature, a power consumption rate, a utilization rate or an operating cost.

EXAMPLE 35

The at least one machine readable medium of example 26, the service processor may be configured as a baseboard management controller.

EXAMPLE 36

The at least one machine readable medium of example 26, the computing resource may be a disaggregate physical element capable of coupling to a rack included in the system of configurable computing resources. The disaggregate physical element may include one of a central processing unit, a memory device, a storage device, a network input/output device or a network switch.

It is emphasized that the below Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus for resource discovery and management in a data center, wherein the data center contains a plurality of racks coupled to a data center management system through a control plane, wherein the apparatus is circuitry of a controller of a rack management system at each of the plurality of racks that is separate from the data center management system, wherein each rack contains a service processor for a system of configurable computing resources, the circuitry comprising:
   a detect component for execution by the circuitry to detect, through the control plane, that a computing resource has been added to the rack;
   a query component for execution by the circuitry to query the service processor for the added computing resource to discover capabilities associated with the added computing resource and obtain a uniform resource locator (URL) to additional information for the discovered capabilities that includes one or more management application plugins or extensions that are used to manage, or control the discovered capabilities;
   a URL component for execution by the circuitry to provide the obtained URL to the data center management system, wherein the data center management system uses the obtained URL to access the additional information for the discovered capabilities; and
   an extension component for execution by the circuitry to retrieve the one or more management application plugins or extensions included in the additional information from the data center management system, wherein the controller uses the retrieved one or more management application plugins or extensions to manage, or control the discovered capabilities of the added computing resource.

2. The apparatus of claim 1, wherein the one or more management application plugins or extensions includes an ability to monitor the discovered capabilities and to manage or control the added computing resource based on monitoring information, the monitoring information including an operating temperature, a power consumption rate, a utilization rate or an operating cost.

3. The apparatus of claim 1, wherein the service processor is configured as a baseboard management controller.

4. The apparatus of claim 1, wherein the added computing resource comprises a disaggregate physical element capable of coupling to a rack included in the system of configurable computing resources, the disaggregate physical element including one of a central processing unit, a memory device, a storage device, a network input/output device or a network switch.

5. The apparatus of claim 1, further comprising a digital display coupled to the circuitry to present a user interface view.

6. A method for resource discovery and management in a data center, wherein the data center contains a plurality of racks coupled to a data center management system through a control plane that connects a controller of a rack management system at each of the plurality of racks to a separate data center management system, wherein each rack contains a service processor for a system of configurable computing resources, the method comprising:
   receiving, at the controller, an indication that a computing resource has been added to the rack through the control plane;
   querying, by the controller, the service processor for the computing resource to discover capabilities associated with the added computing resource and obtain a uniform resource locator (URL) to additional information for the discovered capabilities that includes one or more management plugins or extensions that are used to manage, or control the discovered capabilities;
   providing, by the controller, the obtained URL to the data center management system, wherein the data center management system accesses the additional information for the discovered capabilities using the URL; and
   retrieving, by the controller, the one or more management application plugins or extensions included in the additional information from the data center management system, wherein the controller uses the retrieved one or more management application plugins or extensions to manage, or control the discovered capabilities of the added computing resource.

7. The method of claim 6, wherein the one or more management application plugins or extensions includes an ability to monitor the discovered capabilities and to manage or control the added computing resource based on monitoring information, the monitoring information including an operating temperature, a power consumption rate, a utilization rate or an operating cost.

8. The method of claim 6, wherein the added computing resource comprises a disaggregate physical element capable of coupling to a rack included in the system of configurable computing resources, the disaggregate physical element including one of a central processing unit, a memory device, a storage device, a network input/output device, or a network switch.

9. At least one non-transitory machine readable medium for resource discovery and management in a data center, wherein the data center contains a plurality of racks coupled to a data center management system through a control plane that connects a controller of a rack management system at each of the plurality of racks to a separate data center management system, wherein each rack contains a service processor for a system of configurable computing resources, the machine readable medium comprising a plurality of instructions that in response to being executed by the controller of the rack management system at each of the plurality of racks causes the controller to:
   receive an indication that a computing resource has been added to the rack through the control plane;
   query the service processor for the computing resource to discover capabilities associated with the added computing resource and obtain a uniform resource locator (URL) to additional information for the discovered capabilities that includes one or more management plugins or extensions that are used to manage, or control the discovered capabilities;
   provide the obtained URL to the data center management system, wherein the data center management system accesses the additional information for the discovered capabilities using the URL; and
   retrieve the one or more management application plugins or extensions included in the additional information from the data center management system, wherein the controller uses the retrieved one or more management application plugins or extensions to manage, or control the discovered capabilities of the added computing resource.

10. The at least one machine readable medium of claim 9, wherein the one or more management application plugins or extensions includes an ability to monitor the discovered capabilities and to manage or control the added computing resource based on monitoring information, the monitoring information including an operating temperature, a power consumption rate, a utilization rate or an operating cost.

11. The at least one machine readable medium of claim 9, wherein the added computing resource comprises a disaggregate physical element capable of coupling to a rack included in the system of configurable computing resources, the disaggregate physical element including one of a central processing unit, a memory device, a storage device, a network input/output device, or a network switch.

12. An apparatus for resource discovery and management in a data center, wherein the data center contains a plurality of racks coupled to a data center management system through a control plane, wherein the apparatus is circuitry of a controller of a rack management system at each of the plurality of racks that is separate from the data center management system, wherein each rack contains a service processor for a system of configurable computing resources, the circuitry comprising:
 means for receiving, at the controller, an indication that a computing resource has been added to the rack through the control plane;
 means for querying, by the controller, the service processor for the computing resource to discover capabilities associated with the added computing resource and obtain a uniform resource locator (URL) to additional information for the discovered capabilities that includes one or more management plugins or extensions that are used to manage, or control the discovered capabilities;
 means for providing, by the controller, the obtained URL to the data center management system, wherein the data center management system accesses the additional information for the discovered capabilities using the URL; and
 means for retrieving, by the controller, the one or more management application plugins or extensions included in the additional information from the data center management system, wherein the controller uses the retrieved one or more management application plugins or extensions to manage, or control the discovered capabilities of the added computing resource.

13. The apparatus of claim 12, wherein the one or more management application plugins or extensions includes an ability to monitor the discovered capabilities and to manage or control the added computing resource based on monitoring information, the monitoring information including an operating temperature, a power consumption rate, a utilization rate or an operating cost.

14. The apparatus of claim 12, wherein the added computing resource comprises a disaggregate physical element capable of coupling to a rack included in the system of configurable computing resources, the disaggregate physical element including one of a central processing unit, a memory device, a storage device, a network input/output device, or a network switch.

* * * * *